Jan. 3, 1950    G. POTSTADA    2,493,696
AIR OPERATED SHEARS
Filed Dec. 29, 1945
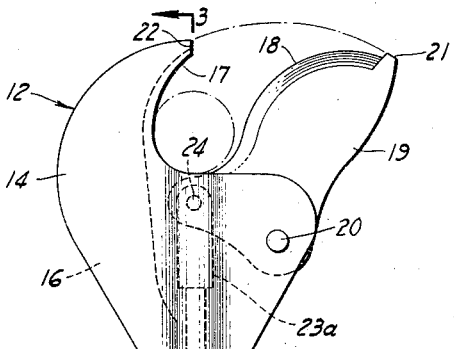
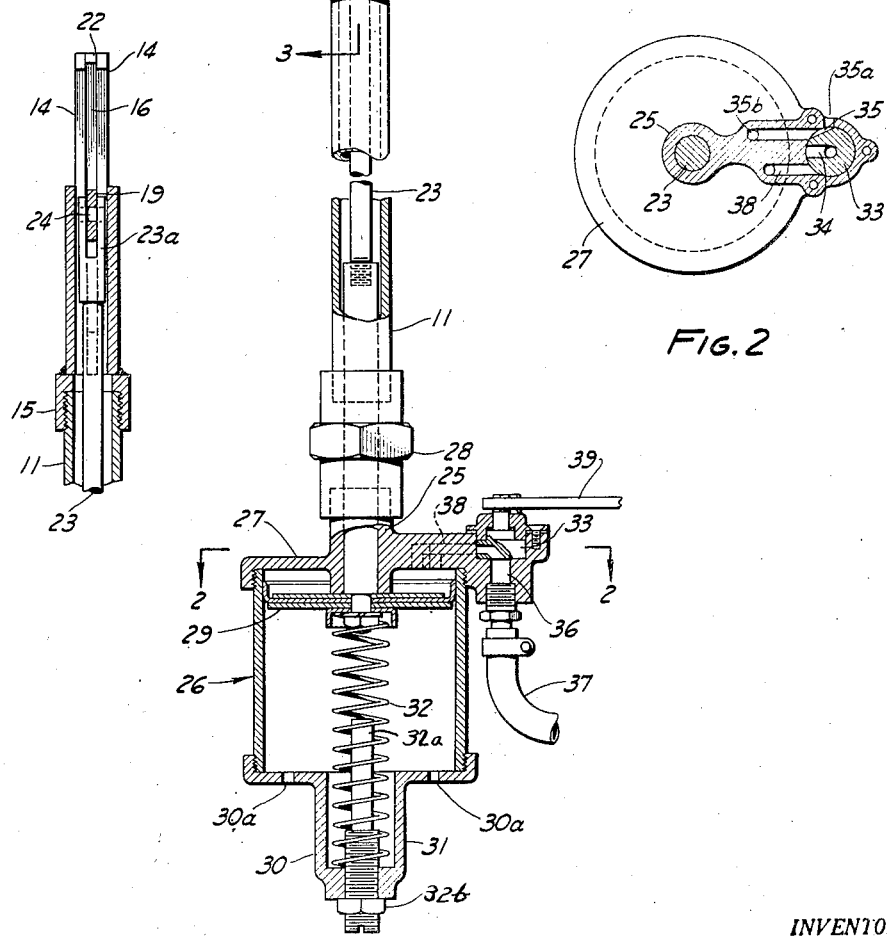
INVENTOR.
GEORGE POTSTADA
BY
Mellin & Hanscom
ATTORNEYS Patented Jan. 3, 1950

2,493,696

UNITED STATES PATENT OFFICE 2,493,696

AIR OPERATED SHEARS

George Potstada, Oakland, Calif.; Magdalena Potstada administratrix of said George Potstada, deceased Application December 29, 1945, Serial No. 638,242

2 Claims. (Cl. 30—228)

This invention relates to pruning shears and particularly pertains to such devices of the general character illustrated, described and claimed in my co-pending application entitled "Pruning shears," filed January 4, 1945, Serial Number 571,325, now abandoned.

It is the principal object of my present invention to generally improve the construction and operation of pruning shears of the character referred to whereby to provide pruning shears which will efficiently operate to shear tree limbs and branches of diameters which could not be sheared by prior pruning shears but required the use of pruning saws.

In practicing my invention I provide an elongated tubular member having a fixed blade secured at one end. A pivotal blade is pivoted to the fixed blade for shearing cooperation therewith. A connector rod extends through the tubular member and is connected at one end to the movable blade and at the other end to the piston of a pneumatic motor so that operation of the piston will be accompanied by operation of the shearing blade. The formation of the blades and the pivotal arrangement is such that a draw cutting action results, this plus the disposition of the points of connection between those parts resulting in considerable leverage enables great ease of operation in shearing limbs and branches of a diameter which hitherto required sawing.

One form which the invention may assume is exemplified in the following description and illustrated by way of example in the accompanying drawings, in which:

Fig. 1 is a view in side elevation of my improved pruning shears with parts shown in central longitudinal section to disclose certain details of construction.

Fig. 2 is a transverse sectional view taken on line 2—2 of Fig. 1.

Fig. 3 is a vertical sectional view taken on line 3—3 of Fig. 1.

Referring more particularly to the accompanying drawings, 10 indicates tree pruning shears embodying my invention. These shears comprise an elongated rigid tubular member 11 which may be of any desired length, depending upon the length it is wished to construct the shears. Shears constructed in accordance with my invention would ordinarily be considerable in length in that its principal use is that of pruning fruit and other trees.

At one end of the tubular member there is fixed thereon a fixed blade 12. This blade is constructed of two complementary members 14 which are identical in formation except that they are right and left. At the longitudinal center of the members 14 they are formed with a socket 15 to receive the end of the tubular member 11 secured by welding or otherwise. As shown, the upper end of the tubular member 11 is projected into the socket 15 and secured therein.

At one side of the tubular member a filler member 16 is inserted between the two members 14 of the fixed blade 12 so that the working edge 17 of the fixed blade will have a shallow recess formed therebetween for the reception of the cutting edge 18 of a pivotal or movable blade 19. From Fig. 1 it will be seen that the working edge 17 of the fixed blade is concave in that it starts from its outermost point, and extends inwardly and laterally, and then on a radius back to the longitudinal center of the tubular member. To this extent the working face 17 of the fixed blade is rather hooked in shape but is definitely concave so that it may receive and hold the branch or limb to be cut in cutting position. The filler member 16 extends short of the working edge 17 so that the cutting edge 18 of the pivotal blade 19 may penetrate into the recess formed intermediate the side faces of the working face or edge 17 and insure complete severance.

The movable or pivotal blade 19 is interposed between the members 14 and is pivoted to the fixed blade as at 20. It will be noticed that the pivotal point 20 is disposed at a distance to the side of the fixed blade 12 and the axial center of the tubular member 11 opposite the side in which is formed the working edge 17 of the fixed blade 12.

The cutting edge 18 of the movable blade 19 is convex or curvilinear, as illustrated, and at its extremity, or the point indicated at 21, it has a stop member to engage the extremity 22 of the fixed blade 12 so as to prevent the edge of the movable blade from being abutted against the fixed blade with excess pressure.

The disposition of the pivotal point 20 relative to the cutting edge 18 of the movable blade 19 and the working edge 17 of the fixed blade 12 is such that the cutting edge 18 will move transversely relative to the working face 17, while at the same time moving longitudinally thereof so as to produce a drawing or slicing type of action. Thus, there is obtained a clean shearing of the branch or limb to be cut without any tendency to crush the same. Likewise, this enables a cut to be made with less effort than would be required by a straight shearing action.

Mounted concentrically within the tube 11 is a connector rod 23, one end of which is fitted with a clevis 23a which, in turn, is pivotally connected as at 24 to the movable blade 19 at a point eccentric to its pivotal connection with the fixed blade. The opposite end of the connector rod 23 is enlarged in diameter and is reciprocable in the gland 25 of the cylinder head 27 of a pneumatic cylinder 26.

The gland 25 is concentrically disposed with reference to cylinder head 27 and the latter is rigidly fixed on the pneumatic cylinder 26 so that the latter will be fixedly mounted at the end of the tube 11. I may prefer to connect the gland 25 to the tube 11 by means of a union 28 to enable disconnection of the pneumatic cylinder 26 therefrom, if I so desire.

Rigidly mounted in the cylinder 26 and snuggly fitting the bore thereof is a piston 29 which is fixed concentrically at the end of the connector rod 23 which extends through the gland 25. At the end of the cylinder 26 opposite the head 27 is a second cylinder head 30 formed with a socket 31 receiving one end of a compression spring 32. The other end of this spring bears against the adjacent surface of piston 29. The spring 32 constantly tends to maintain the piston 29 in its uppermost position which disposes the cutting or shearing blade 19 to its open or normal position.

Formed in the base of the socket 32 in the cylinder head 30 is a threaded opening to receive the complemental threaded section of a piston stop 32a which extends upwardly concentrically within the spring 32 and in axial alignment with the axis of the piston 29. The reciprocable movement of the piston 29 is thereby limited by the cylinder head 27 and the stop 32a. By turning the stop 32a in the cylinder head 30, it can be adjusted upwardly or downwardly relative thereto, and the length of the stroke of the piston 29 varied as is desired. A lock nut 32b has been provided to hold the stop 32a in fixed position after the adjustment has been made.

I want to point out at this time that the pivotal connection between the clevis 23a at the upper end of the connector rod 23 and the blade 19 is approximately at the axial center of the tube 11 so that the connector rod 23 will move substantially concentrically of the tube 11 during operation.

The pneumatic cylinder 26 is provided with a rotary control valve 33 having an intake port 34 and an exhaust port 35. The intake port 34 is adapted to form a communication between a source of air under pressure conducted to a port 36 by means of a suitable connection 37 and a cylinder intake port 38 formed through the head 27 of the cylinder.

When the valve 33 is turned to register the intake port 34 with the intake port 38 of the cylinder head 27, air under pressure from connection 37 may pass through the port 36, the port 34 in the rotary control valve 33, the intake port 38 into the cylinder at one end of the piston forcing the latter toward the head 30. This will axially move the connector rod 23 to actuate the cutting blade 19 causing the latter to effect a shearing cut as previously described. When the valve 33 is turned to place the port 34 out of register with the port 38, the exhaust port 35 automatically registers with an exhaust port 35a in the valve casing and an exhaust port 35b in the cylinder head so that the end of the cylinder adjacent the head 27 will be placed in communication with the atmosphere to permit the piston 29 to move axially toward the head 27 and thereby move the cutting blade 19 to open or normal position. The piston 29 will be moved to accomplish such result by the spring 32.

The rotary valve 33 is provided with an operating handle 39 to enable the operator to actuate the shearing head of the shears through the medium of the pneumatic motor, as previously described.

For orchard work I intend that a portable source of air under pressure be provided and that the same be connected by a flexible hose or other connection 37 to the pneumatic motor so that the operator may freely work beneath the trees in pruning the same. The entire device is of light weight so that an operator may easily manipulate the same.

In actual practice I construct the pruning shears substantially as illustrated and described with the length of the tubular member 11 calculated to meet the conditions to which the pruning shears are to be put. Due to the provision of the spring 32 the movable blade 19 will be normally disposed in open position so that the hooked or concave working face of the stationary blades may be hooked on to the branch or limb to be sheared and dispose the limb in the curved portion of the working face 17 so that the full force and effect of the cutting action will be applied when the blade 19 is actuated to effect the shear. In that the blade 19 is constructed and so mounted that the cutting action will be a drawing or slicing cut but a minimum of power is necessary to effect the severing of the branch or limb.

To operate the blade 19 to effect the shearing, the operator turns the handle 39 so that the port 34 of the valve 33 registers with the cylinder port 38. This forces the piston 29 toward the head 30 of the cylinder 26. This movement of the piston 29 effects axial movement of the connector rod 23, causing the blade 19 to pivot about its pivot point and perform its shearing operation in conjunction with the stationary working face, as previously described.

After the cut or severance has been effected, the operator again manipulates the handle 39 to place the port 34 out of register with the cylinder port 38 and place the exhaust port 35 in register with the exhaust ports 35a and 35b, allowing the air under pressure in the cylinder to exhaust to the atmosphere. As this air is exhausted, the spring 32 will move the piston 29 toward the piston head 27, again placing the blade 19 through the medium of the connector rod 23 in open position for a subsequent operation. To prevent air compression in the end of the cylinder adjacent the head 30, bleeder ports 30a are provided in the head member 30.

It should be noted that the piston stop 32a can be so adjusted that piston 29 will move within the cylinder 26 only such distance as is necessary to effect the shearing operation. This relieves the connector rod 23, the movable blade 19, and their pivotal connection of further stress or tension after the shearing operation has been completed. While, as stated above, the stop member at 21 prevents the edge of the movable blade from abutting against the fixed blade with excess pressure, I prefer to adjust the piston stop so that the pivotal movement of the movable blade will terminate immediately before the stop member 21 strikes the extremity 22 on the fixed blade. Thus the forcing of the movable blade against the unyielding fixed blade can be prevented.

From the foregoing it is obvious that I have provided an improved pruning shears capable of use in pruning the comparatively large branches or limbs of trees. To my knowledge there have been no prior shears capable of shearing such large branches or limbs and that it has been the practice hitherto to prune the branches or limbs by making use of a pruning saw.

Obviously by the use of my improved pruning shears, an operator may by the use of a single tool not only prune the smaller branches and stems but may at the same time and with the same tool shear the larger limbs which hitherto required the use of a pruning saw.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. Pruning shears comprising a tubular member, a fixed blade rigidly secured on one end of said tubular member and having a working face at one side of the longitudinal center of the tubular member beyond the end thereof, a movable blade pivoted to the fixed blade and having a working surface disposed on the opposite side of the center of the tubular member when said blade is in open position, a pneumatic motor having a cylinder with two opposing cylinder heads, the first of said cylinder heads being secured to and in axial alignment with said tubular member, a movable piston in said cylinder, an elongated connector rod extending through said tubular member and connected at one end to the movable blade and at the opposite end to said piston whereby reciprocation of the latter will correspondingly actuate the former, a stop member adjustably mounted in the second of said cylinder heads to limit the reciprocable movement of the piston, a compression spring disclosed intermediate said second cylinder head and piston tending to move said piston toward the first cylinder head, and manually operated valve means to be connected with a source of air under pressure and operable to admit the same to the cylinder to actuate the piston and move it toward the second cylinder head.

2. A pneumatic motor comprising a cylinder having two opposing cylinder heads, the first of said cylinder heads being adapted to be mounted on the end of a tube in such a manner that the cylinder is in axial alignment with said tube, a movable piston in the cylinder, a coil spring disposed intermediate the piston and the second cylinder head constantly urging the piston toward the first cylinder head, manually operated valve means to be connected with a source of air under pressure and operable to admit the same to the cylinder to actuate the piston and move it toward the second cylinder head, and a stop member adjustably mounted in said second cylinder head whereby the stroke of the piston can be limited to a predetermined length.

GEORGE POTSTADA.

REFERENCES CITED

The following references are of record in the file of this patent:

UNITED STATES PATENTS

| Number | Name | Date |
| --- | --- | --- |
| 146,439 | Ellis | Jan. 13, 1874 |
| 728,068 | Young | May 12, 1903 |
| 2,075,341 | Goodman | Mar. 30, 1937 |
| 2,366,909 | Johnson | Jan. 9, 1945 |

FOREIGN PATENTS

| Number | Country | Date |
| --- | --- | --- |
| 557,609 | France | May 8, 1923 |